(12) United States Patent
Webster

(10) Patent No.: US 7,802,760 B2
(45) Date of Patent: Sep. 28, 2010

(54) BOUNDARY LAYER CONTROL ARRANGEMENT

(75) Inventor: John R Webster, Derby (GB)

(73) Assignee: Rolls-Royce PLC, London (GB)

( * ) Notice: Subject to any disclaimer, the term of this patent is extended or adjusted under 35 U.S.C. 154(b) by 951 days.

(21) Appl. No.: 11/176,247

(22) Filed: Jul. 8, 2005

(65) Prior Publication Data

US 2006/0032988 A1 Feb. 16, 2006

(30) Foreign Application Priority Data

Aug. 14, 2004 (GB) .................................. 0418196.2

(51) Int. Cl.
*B64C 21/04* (2006.01)
(52) U.S. Cl. .................................. 244/207
(58) Field of Classification Search .............. 244/207, 244/130, 199.1–199.4, 204, 201
See application file for complete search history.

(56) References Cited

U.S. PATENT DOCUMENTS

| | | | |
|---|---|---|---|
| 1,580,577 A * | 4/1926 | Baumann | 244/207 |
| 2,478,726 A * | 8/1949 | Serge | 244/207 |
| 3,194,518 A * | 7/1965 | Walsh | 244/130 |
| 4,802,642 A * | 2/1989 | Mangiarotty | 244/200 |
| 4,838,502 A * | 6/1989 | Pinson | 244/49 |
| 5,447,283 A * | 9/1995 | Tindell | 244/207 |
| 5,599,229 A | 2/1997 | Claunch et al. | |
| 6,379,110 B1 | 4/2002 | McCormick et al. | |
| 6,446,904 B1 * | 9/2002 | Stanek | 244/1 N |
| 2002/0190165 A1 * | 12/2002 | Glezer et al. | 244/207 |
| 2006/0145027 A1 * | 7/2006 | Warsop et al. | 244/207 |

* cited by examiner

*Primary Examiner*—Tien Dinh
(74) *Attorney, Agent, or Firm*—Oliff & Berridge, PLC

(57) ABSTRACT

A boundary layer control arrangement comprises a pulse generator communicating with a surface having a fluid boundary layer thereacross. The boundary layer control arrangement further includes a fluid supply means for supplying a fluid to the surface via the pulse generator. The pulse generator is constructed such that fluid acts on the pulse generator to cause the fluid to pulse. Pulsing fluid passes from the pulse generator to the surface.

44 Claims, 11 Drawing Sheets

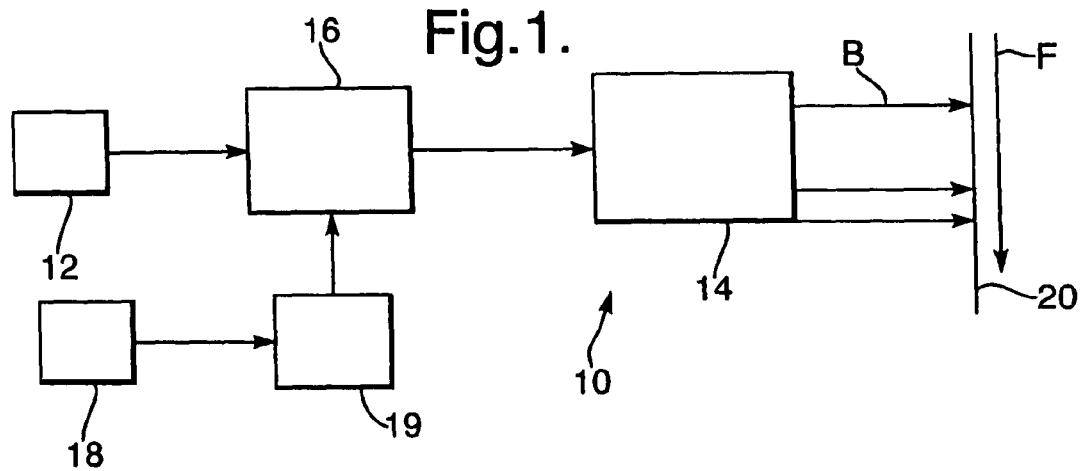
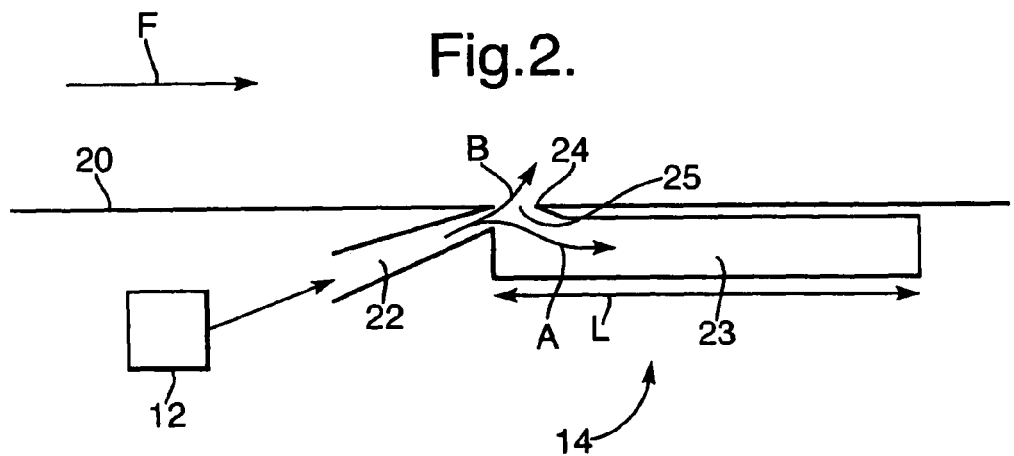
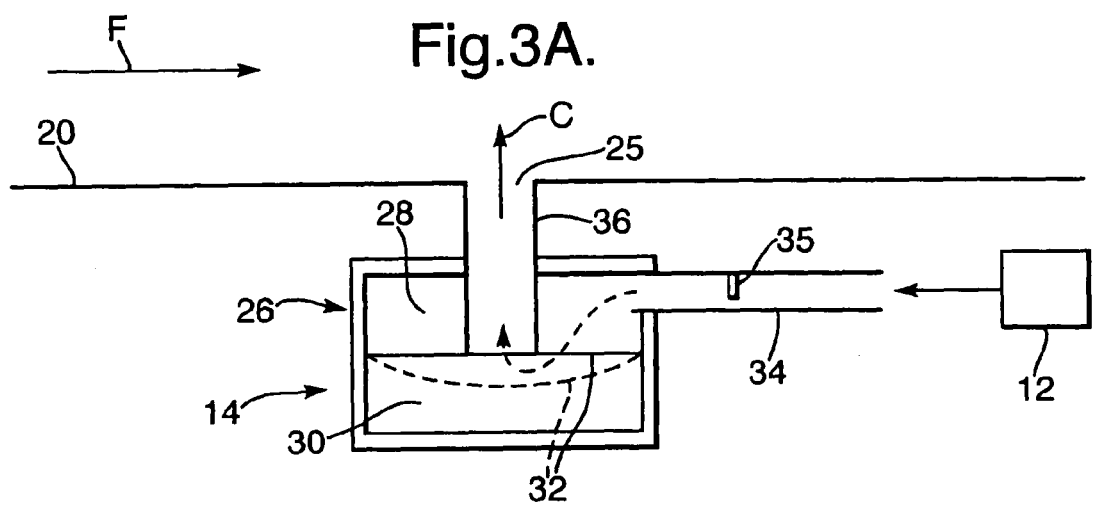

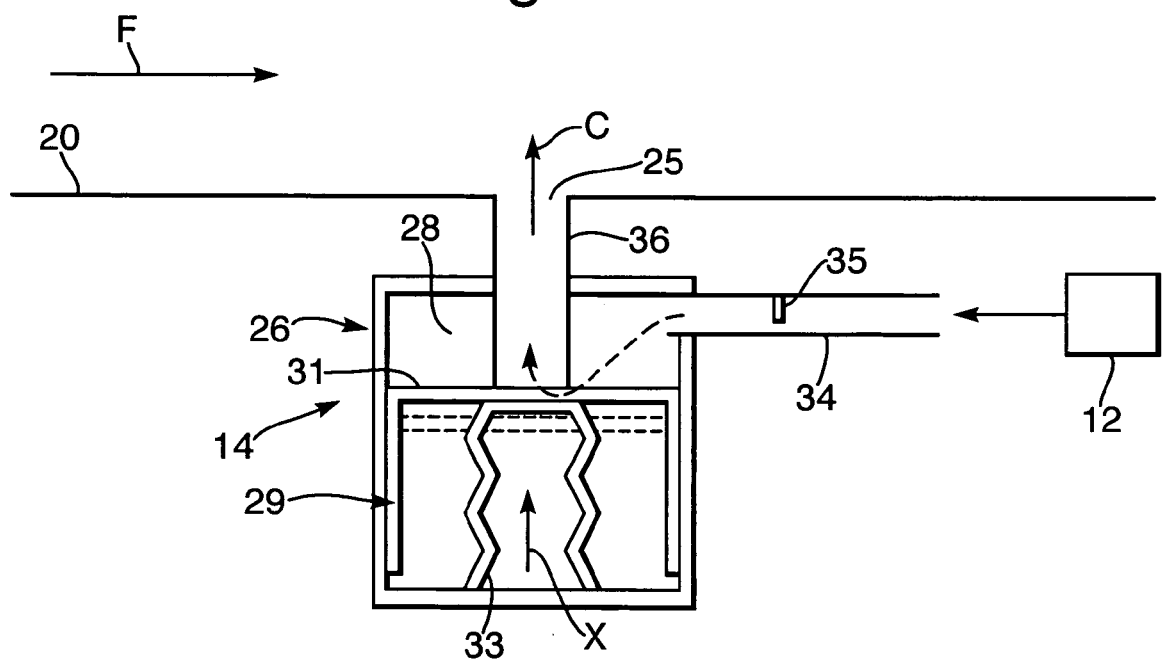
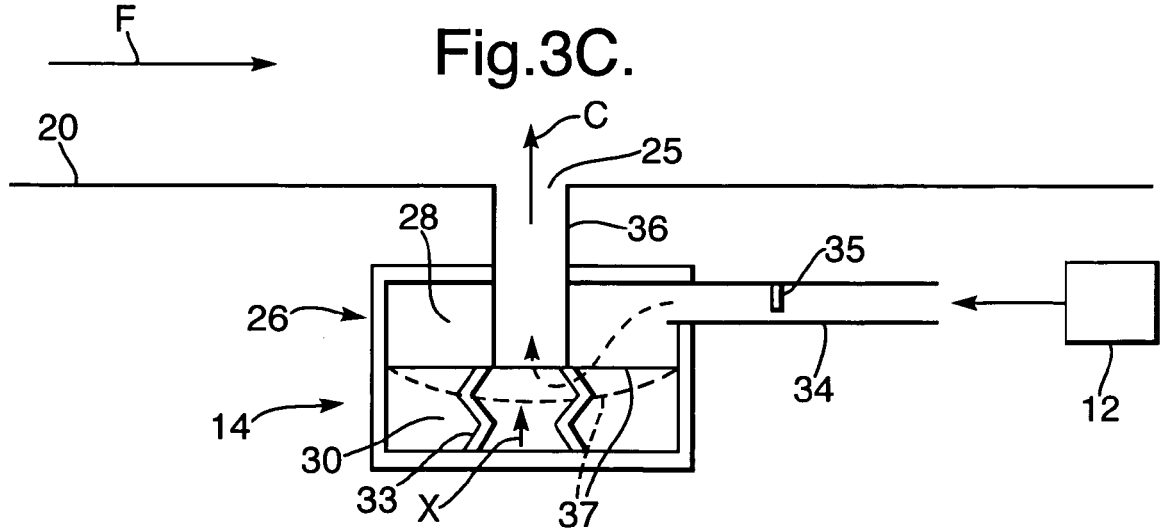

BOUNDARY LAYER CONTROL ARRANGEMENT

TECHNICAL FIELD

This invention relates to boundary layer control arrangements. More specifically, but not exclusively, the invention relates to boundary layer control arrangements for use in gas turbine engines.

BACKGROUND OF THE INVENTION

The passage of air over various components in gas turbine engines is influenced by the nature of the boundary layer of air across various surfaces. In some circumstances, it is necessary to ensure that the boundary layer remains on the surface across which the air is flowing, in other circumstances it is necessary to disrupt the boundary layer and prevent it flowing adjacent to the surface.

BRIEF SUMMARY OF THE INVENTION

According to one aspect of this invention, there is provided a boundary layer control arrangement comprising a pulse generator communicating with a surface having a fluid boundary layer thereacross, and a fluid supply means for supplying a fluid to the surface via the pulse generator, wherein the pulse generator is constructed such that the fluid acts on the pulse generator to cause the fluid to pulse, whereby pulsing fluid passes from the pulse generator to the surface.

Preferably, the action of the fluid on the pulse generator creates said pulses in the fluid.

The pulse generator is preferably a passive pulse generator. Conveniently, the pulse generator comprises a wave generator for creating waves in the fluid. Preferably, the pulse generator comprises a sound wave generator for creating sound waves in the fluid. Desirably, the pulse generator can establish pulses in the fluid which are in the form of sound waves. The pulses may be at a predetermined substantially constant frequency.

In one embodiment, the pulse generator may comprise a chamber to receive at least some of the fluid from the fluid supply means. The chamber is conveniently configured such that a standing wave is created in the fluid in the chamber. In this embodiment, the pulse generator may comprise a fluid splitting member to split fluid from the fluid supply means, such that some of said fluid passes into the chamber, and some of said fluid passes to the surface.

The pulse generator may define an aperture via which the fluid supply means communicates with the surface. Preferably, the chamber extends from the aperture. The splitting member may be provided at the aperture. Preferably, the chamber is elongate.

In another embodiment, the pulse generator may comprise a chamber having a first sub-chamber, a second sub-chamber and a pressure responsive barrier between the first and second sub-chambers.

The pulse generator may define an aperture via which fluid from said chamber can pass to the surface. Pulse generator may further comprise an exit conduit extending to said aperture, whereby fluid can pass from the first sub-chamber to the surface via said exit conduit. The exit conduit may be split into a plurality of sub-conduits to provide a plurality of outlets of the surface. The pressure responsive barrier is preferably movable between an open condition to allow fluid to pass into the exit conduit, and a closed condition to prevent fluid entering the exit conduit.

Preferably, the fluid supply means supplies said fluid to the first sub-chamber to cause the barrier to respond and allow said fluid to pass through the conduit. Preferably, the barrier responds by deforming to allow fluid in the sub-chamber to enter the conduit. Preferably, the barrier is configured to respond when the pressure of fluid in the first sub-chamber reaches a pre-determined limit, the predetermined limit is desirably a pressure greater than the pressure in the second sub-chamber. Desirably the barrier is constructed to move to a deformed condition to open the conduit when the pressure in the first sub-chamber reaches the predetermined limit. Preferably, when fluid enters the conduit, the barrier moves to the non-deformed condition to close the conduit.

Alternatively, the barrier may comprise a flexible diaphragm or a piston, and urging means, such as a spring. The urging means may provide a force to urge the diaphragm or piston to close the conduit until the pressure in the first chamber overcomes the force applied by the urging means.

The fluid supply means may comprise a restrictor to restrict fluid into the first sub-chamber.

The boundary layer control arrangement may comprise a fluid supply regulator to regulate the supply of said fluid. The fluid supply regulator may comprise a valve, which may be configured to have an on condition and an off condition. Alternatively, the fluid supply regulator may comprise a valve, and may be configurable to vary the supply of said fluid continuously or in stepped changes. The arrangement may comprise a controller means to control the fluid supply regulator. The controller may be an electronic controller. Preferably, the controller means controls the valve.

The boundary layer control arrangement may comprise adjustment means to adjust the nature of the pulses in the fluid. Preferably, the adjustment means can adjust the frequency of the pulses in the fluid.

In the first embodiment, the adjustment means may comprise a wall of the chamber which may be movable along said chamber to alter the frequency of the standing wave in the chamber. Preferably, the wall is a wall opposite the fluid supply means.

In the second embodiment, the adjustment means may comprise an adjustment aperture for the second sub-chamber to allow a fluid to flow into or out of the second sub-chamber, thereby adjusting the pressure in the second sub-chamber. Thus, by adjusting the pressure in the second sub-chamber, the predetermined pressure at which the barrier deforms to allow fluid to pass into the conduit is also changed.

In another embodiment, the pulse generator comprises a vibratable member to receive fluid from the fluid supply means. The vibratable member is preferably vibratable by the action of fluid from the fluid supply means thereon. The vibratable member may comprise a reed.

According to another aspect of this invention, there is provided a boundary layer control system comprising a plurality of boundary layer control arrangements as described above. Preferably, the boundary layer control system comprises fluid distribution means to distribute fluid to the respective boundary layer control arrangements. The fluid distribution means may comprise a manifold.

According to another aspect of this invention, there is provided a gas flow conduit of an engine, said gas flow conduit comprising a boundary layer control arrangement as described above.

Preferably, the gas flow conduit comprises a gas intake for the engine. The engine may comprise a gas turbine engine and the intake may comprise a nacelle.

Preferably, the conduit may comprise a boundary layer control arrangement on the inner surface, and may also comprise a boundary layer control arrangement on the outer surface. Preferably, the intake comprises a boundary layer control system as described above.

In another embodiment, the conduit may comprise a duct in an engine, such as a gas turbine engine.

Preferably, the characteristics of the boundary layer control arrangement are pre-selected to match the conditions of the conduit. The conduit may comprise a plurality of boundary layer control arrangements.

According to another aspect of this invention, there is provided an aerofoil comprising a boundary layer control arrangement to control the boundary layer of fluid flowing across the aerofoil.

The boundary layer control, arrangement may be described as above. Alternatively, the boundary layer control arrangement may comprise an active boundary layer control arrangement. Conveniently, such active arrangements comprise active systems such as micro-electro-mechanical systems (MEMS), virtual jets.

In one embodiment, the active boundary layer control arrangement comprises a piston and cylinder arrangement, which may communicate with the surface of the aerofoil via an aperture control means, which may be provided to control the rate of reciprocation of the piston in the cylinder, thereby providing a pulsed jet of air into and out of the cylinder through the aperture.

In another embodiment, the active boundary layer control arrangement may comprise a conduit to supply air to the surface of the aerofoil via an aperture. An oscillatable valve may be provided in the conduit to provide pulsed air out of the aperture. The valve may be oscillatable between open and closed conditions to provide said pulsed air.

Control means may be provided to control the piston and cylinder arrangement and/or the oscillatable valve. The control means may include sensors to sense the condition of the boundary layer and thereby provide an appropriate frequency of the pulses.

In one embodiment, the aerofoil may comprise a fan blade of a fan of a gas turbine engine. In another embodiment, the aerofoil may comprise a vane of a rotary component of a gas turbine engine. The vane may comprise a stator vane of a compressor, or a nozzle guide vane of a turbine.

In the first embodiment, the boundary layer control arrangement may be arranged towards the trailing edge of the fan blade. Thus, in this embodiment, the boundary layer control arrangement disrupts the air towards the trailing edge, thereby disrupting the interaction of the air in the wake with further aerofoil downstream of the blade. This has the advantage of reducing noise from the engine, by reducing the interaction between the wake and the outlet guide vanes.

In another embodiment, the noise reduction effect can be achieved by alternately operating boundary layer control arrangements in the compression and suction sides of the blade. This has the advantage, in this embodiment, of providing an alternating effect at the trailing edge, which turns/interrupts the air in opposite directions in order to produce more disruption of the wake and hence more noise reduction.

In the second embodiment, the boundary layer control arrangement may comprise a boundary layer control arrangement as described above. Alternatively, the boundary layer control arrangement may comprise a blowing means for blowing air off the trailing edge of the blade. The blade can be any blade in the engine, such as a fan blade, a compressor blade or a turbine blade.

BRIEF DESCRIPTION OF THE DRAWINGS

Embodiments of the invention will now be described by way of example only with reference to the accompanying drawings, in which:

FIG. 1 is a flow diagram of a boundary layer control arrangement;

FIG. 2 is a diagrammatic view of one embodiment of a boundary layer control arrangement;

FIG. 3A is a diagrammatic view of a second embodiment of a boundary layer control arrangement;

FIG. 3B is a diagrammatic view of a modified version of the second embodiment of the boundary layer control device shown in FIG. 3A;

FIG. 3C is a diagrammatic view of another modified version of the second embodiment of the boundary layer control device shown

DETAILED DESCRIPTION OF THE INVENTION

Figure 4A:
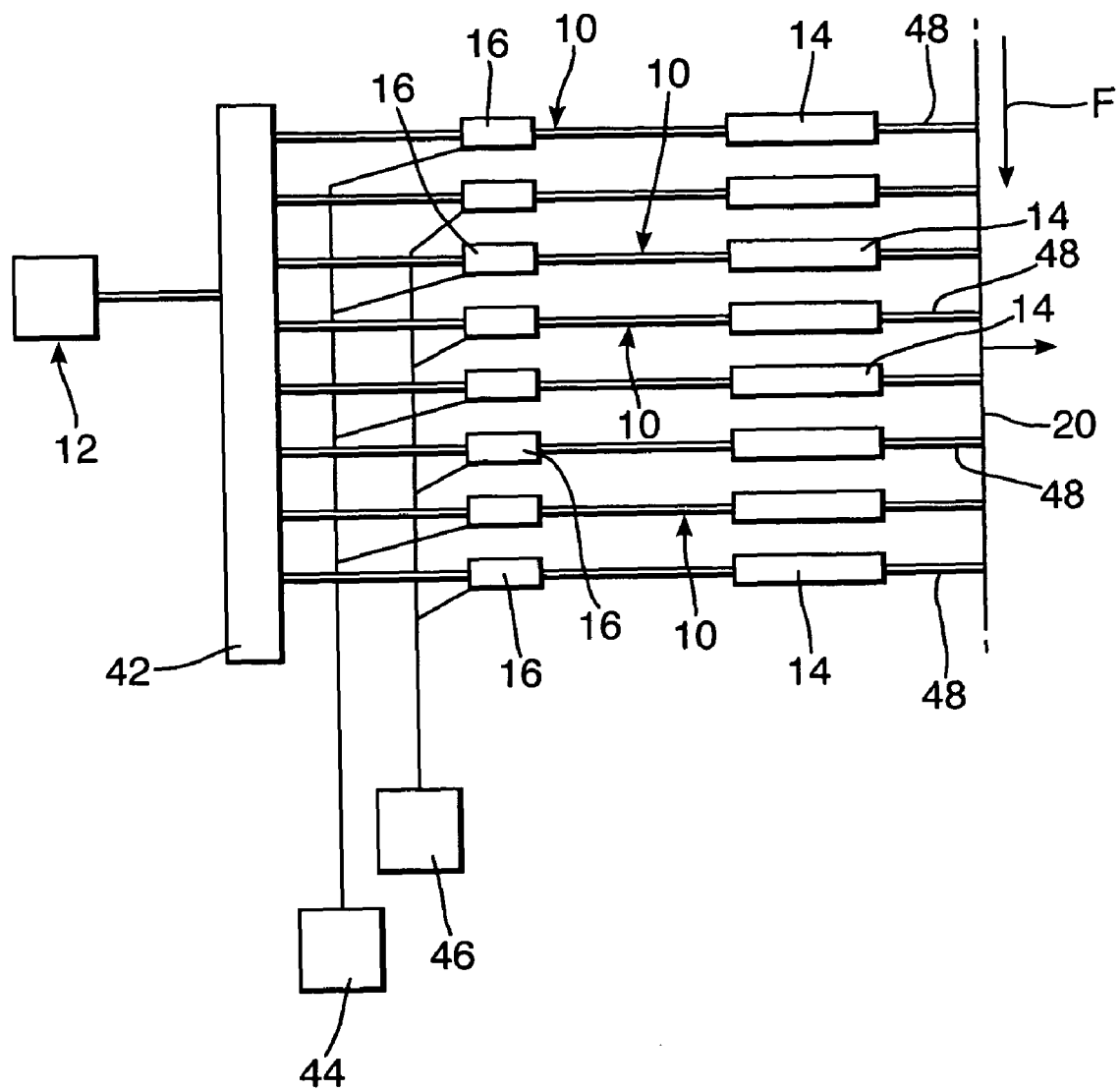
FIG. 4A is a schematic diagram of a boundary layer control system.

In gas turbine engines, where gas flows over various surfaces, for example aerofoils and ducts, it is often important to be able to control the boundary layer of the flow of air at that surface. FIG. 1 shows a schematic flow diagram of a boundary layer control arrangement 10. The boundary layer control arrangement 10 comprises supply means 12 for supplying air to an air flow modulator or a pulse generator 14. A valve 16 is provided between the air supply means 12 and the pulse generator 14 to turn on or off the flow of air to the pulse generator 14. The valve 16 is an on-off valve and is controlled by suitable electronic controller 18 which supplies a suitable signal 19 to turn the valve on or off.

Air from the pulse generator 14 passes therefrom to ducts/holes in a surface 20 across which air F is flowing. The boundary layer of the air flow at the surface is controlled by the pulsed air B from the pulse generator 14.

Referring to FIG. 2, there is shown an embodiment of a pulse generator 14 for controlling a boundary layer of a flow of air F across a surface 20. The pulse generator 14 shown in FIG. 2 comprises a conduit 22 for supplying air, and a chamber 23. The pulse generator 14 also includes a splitting member 24 at an aperture 25 in the surface 20 for splitting flow of air into two flows; a first flow A into the chamber 23, and a second flow B out of the aperture 25.

The chamber 23 has a predetermined length L to enable a standing wave to be established in the air within the chamber 23. The standing wave causes the air exiting out of the aperture 25 to pulse at the same frequency as the standing wave in the chamber 23, thereby disrupting or energising the boundary layer of the flow F of air across the surface 20.

FIG. 3A shows an alternative embodiment of a pulse generator 16 comprising a chamber 26 having a first sub-chamber 28 and a second sub-chamber 30. A flexible membrane 32 extends between the first and second sub-chambers 28, 30. An inlet conduit 34 allows air to be supplied to the first sub-chamber 28. A restrictor 35 restricts the flow rate of air to the first sub-chamber 28.

As more air enters the first sub-chamber 28, the pressure inside the first sub-chamber 28 increases until the flexible membrane 32 deforms to the position shown in broken lines in FIG. 3A. When this happens, the air passes into an exit conduit 36 which leads to the aperture 25 in the surface 20. The air passes through the aperture 25, as shown by the arrow C. As the air passes through the exit conduit 36, the pressure in the first sub-chamber 28 reduces thereby causing the membrane 32 to move back to its non-deformed condition shown in unbroken lines in FIG. 3A.

It will be appreciated that with a continuous supply of air into the first sub-chamber conduit 28, there will be a vibration set up in the membrane 32 and this vibration will be dependent upon the pressure inside the second sub-chamber 30. Thus, the air C exiting via the exit conduit 36 is pulsed having a frequency equal to the frequency of vibration of the membrane 32.

FIG. 3B shows a modified version of the embodiment shown in FIG. 3A. In FIG. 3B, the chamber 26 houses a piston 29 having a sealing member 31. that engages against the exit conduit 36 the sub-chamber 28 is provided above the sealing member 31, as shown in FIG. 3B. Urging means in the form of a spring, shown schematically at 33 urges the piston 29 in the direction indicated by the arrow X. The spring 33 provides a predetermined force to urge the sealing member 31 against the exit conduit 36. As air is pumped into the sub-chamber 28 as shown, the pressure in the sub-chamber 28 increases until the force downwardly on the sealing member 31 exceeds the predetermined force on the sealing member 31 by the spring 33, at which time the piston is urged by the pressure in the sub-chamber 28 in the opposite direction to the direction indicated by the arrow X. Fluid thus passes into the exit conduit 36.

Hence, in the same way as explained above with reference to FIG. 3A continuous pumping of air into the sub chamber 28 causes a vibration to be set up in the movement of the piston 29, and as a result air exiting via the exit conduit 36 has a tonal frequency equal to the frequency of vibration f the piston 29.

The version shown in FIG. 3C is similar to the version shown in FIG. 3B, but the version shown in FIG. 3C comprises a flexible diaphragm 37 which is urged into the sealing engagement with the exit conduit 36 by urging means in the form of a spring 33. The flexible diaphragm is held in sealing engagement with the exit conduit 36 by the spring 33 to prevent air in the sub-chamber 28 passing into the exit conduit 36. In the same way as explained above the increase in pressure in the sub-chamber 28 eventually creates a greater force on the diaphragm than the urging force of the spring 33, causing the diaphragm to move in the opposite direction to the direction indicated by the arrow X. As a result, in the same way as described above the diaphragm is caused to vibrate and a tonal frequency is set up in the air passing through the exit conduit 36.

Referring to FIG. 4, there is shown a boundary layer control system 40 comprising a plurality of boundary layer control arrangements 10 linked together by a manifold 42 to which air is supplied from the air supply means 12. On-off valves 16 are each connected to one of two control means 44, 46, depending upon the nature of the operating conditions, or upon the different degrees of air flow turning required. As can be seen some of the pulse generators 14 are connected to a first control means 44 in the form of a first electronic controller. The other pulse generators 14 are connected to a second control means 46 in the form of a second electronic controller. Conduits 48 lead to a plurality of apertures 50 in the surface 20 to which pulsed air is delivered.

Figure 4B:
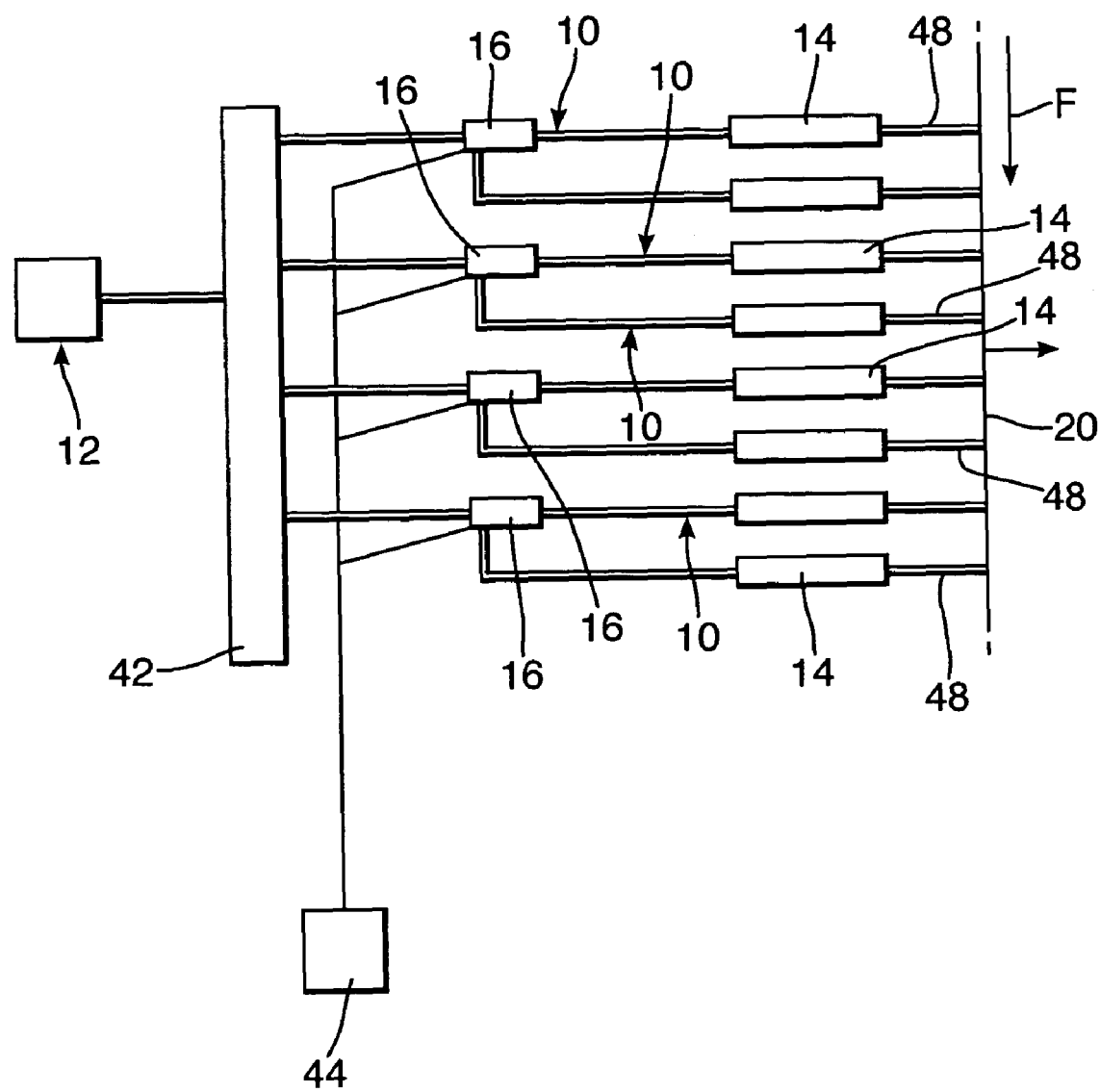
FIG. 4B is a schematic diagram of a modified version of the boundary layer control system shown in FIG. 4A.

In the system 40 shown in FIG. 4 air is supplied by the air supply means 12 to the manifold 42. Air from the manifold then passes via on-off valves 16 that are switched "ON" to the respective pulse generators 14. Thereafter pulsed jets of air are delivered via the respective conduits 50 to the surface 20 to influence the boundary if the flow of air F across the surface 20. Alternatively, each valve 16 could allow air to be supplied to a plurality of pulse generators 14, as shown in FIG. 4B.

Figure 5:
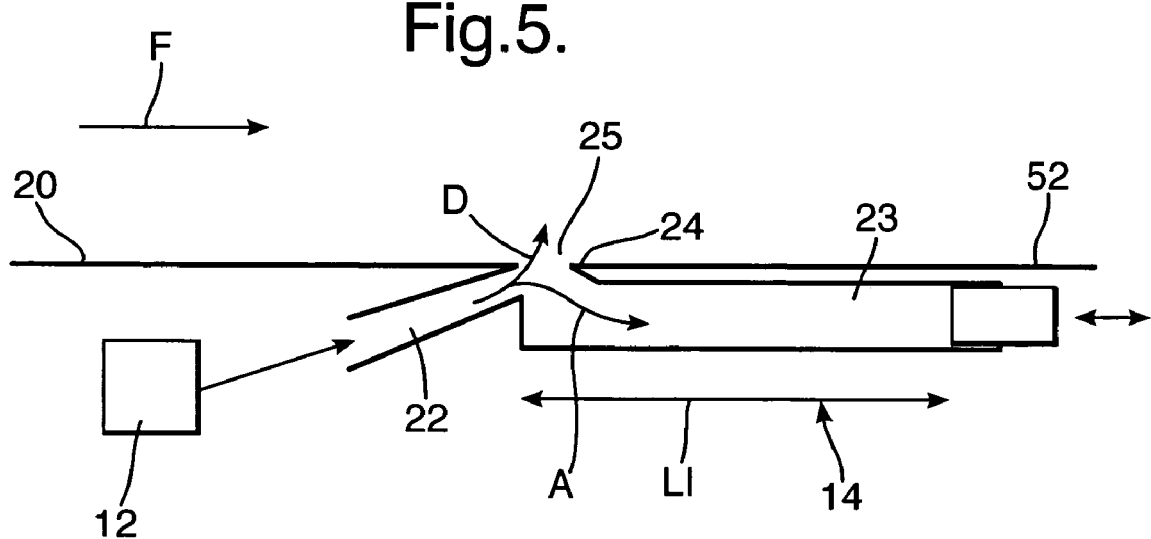
FIG. 5 is a diagrammatic view of a third embodiment of a boundary layer control arrangement.

Referring to FIG. 5, there is shown a modification to the pulse generator 14 shown in FIG. 2. The pulse generator 14 in FIG. 5 comprises many of the same features as shown in FIG. 2 and these have been designated with the same reference numeral.

The pulse generator 14, in FIG. 5 differs from that shown in FIG. 2 by the provision of a movable end wall 52 remote from the conduit 22. The end wall 52 is movable as shown by the arrow D to adjust the effective length L1 of the chamber 23. By selecting suitable effective lengths L1 of the chamber 23 the frequency of vibration of a standing wave created in the chamber 23 can be varied, thereby varying the frequency of the pulsed air B exiting via the aperture 25.

Figure 6:
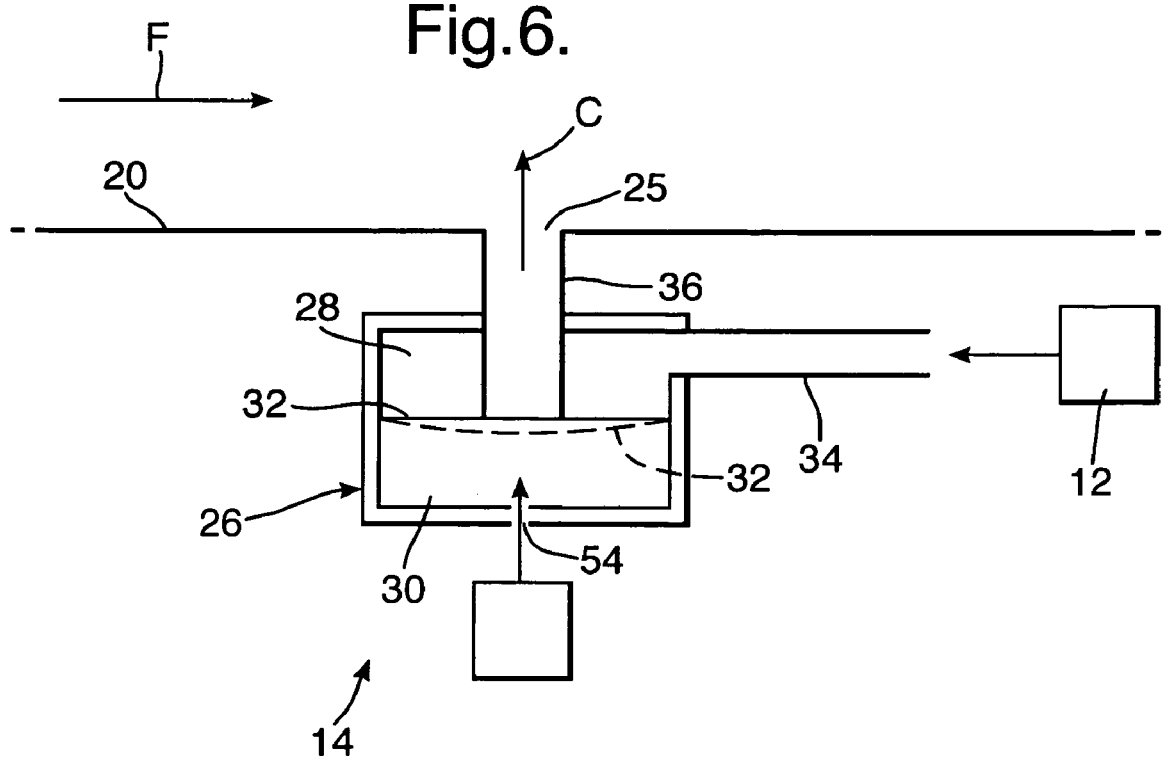
FIG. 6 is a diagrammatic view of a fourth embodiment of a boundary layer control arrangement.

Referring to FIG. 6, there is shown a modification of the pulse generator 14 shown in FIG. 3. The pulse generator 14 shown in FIG. 6 comprises many of the same features as shown in FIG. 3, these have been designated with the same reference numerals.

The pulse generator 14 shown in FIG. 6 differs from that shown in FIG. 3 by the provision of a pressure adjusting aperture 54 in the wall of the chamber 26 that leads to the second sub-chamber 30. Suitable pressure adjusting means 56 is provided to supply air to, or remove air from, the second sub-chamber 30. In this way the frequency of vibration of the membrane 32 is varied, thereby varying the frequency of the pulsed jet C passing through the exit conduit 36 and the aperture 25.

Figure 7:
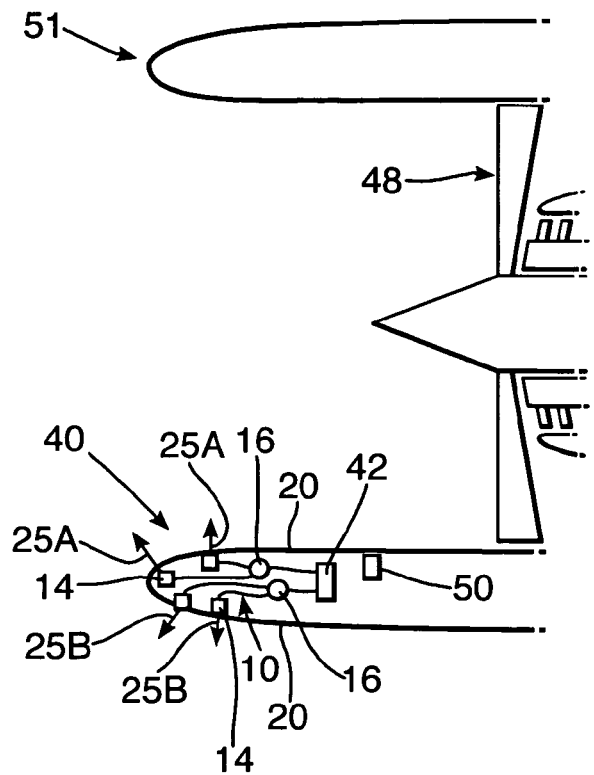
FIG. 7 is a diagrammatic view of a boundary layer control system arranged in the nacelle of a gas turbine engine.

Referring to FIG. 7, there is shown a diagrammatic sectional view of the front of a gas turbine engine showing a nacelle 50 and a fan 48 at which a boundary layer control system 40 has been provided. The boundary layer control system 40 comprises a plurality of boundary layer control arrangements 10 as described above arranged to provide pulsed air via apertures 25A at internally of the nacelle 51 and via apertures 25B externally of the nacelle 51 to control the boundary layer in those respective regions.

A sensor 50 can be provided to sense the condition of the boundary layer.

An advantage of this arrangement is that it maintains the boundary layer during periods of excessive side wind or during rotation of the aircraft, or during descent or windmilling when air must be shed around the outside of the nacelle.

Figure 8:
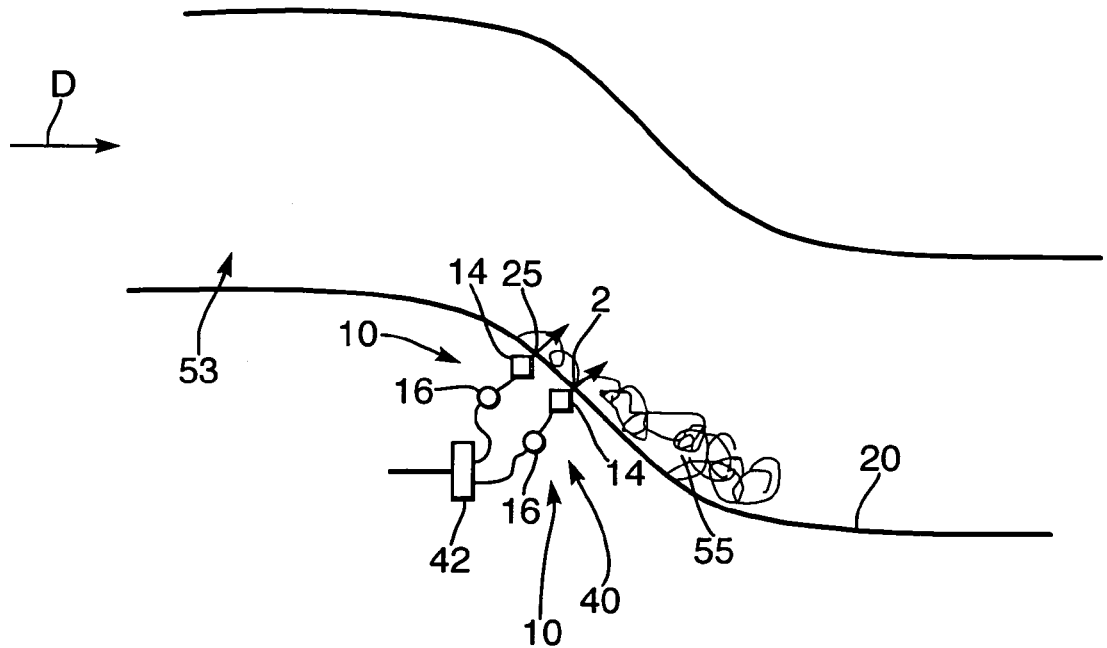
FIG. 8 is a diagrammatic view of a boundary layer control arrangement arranged in an S shaped inlet of a gas turbine engine.

FIG. 8 shows a diagrammatic view of an S-shaped inlet 53 for a gas turbine engine for example, in an aircraft where stealth applications are important. In the inlet 53 air flows in the direction of the arrow D. A boundary layer control system 40, comprising a plurality of boundary layer control arrangements 10 is provided. The pulsed air emitted from the boundary layer control arrangements 10 via the apertures 25, to the surface 20, controls the boundary layer flowing over the surface of the S-shaped inlet maintaining the boundary layer in contact with the surface, as shown at 55 in FIG. 8.

Figure 9:
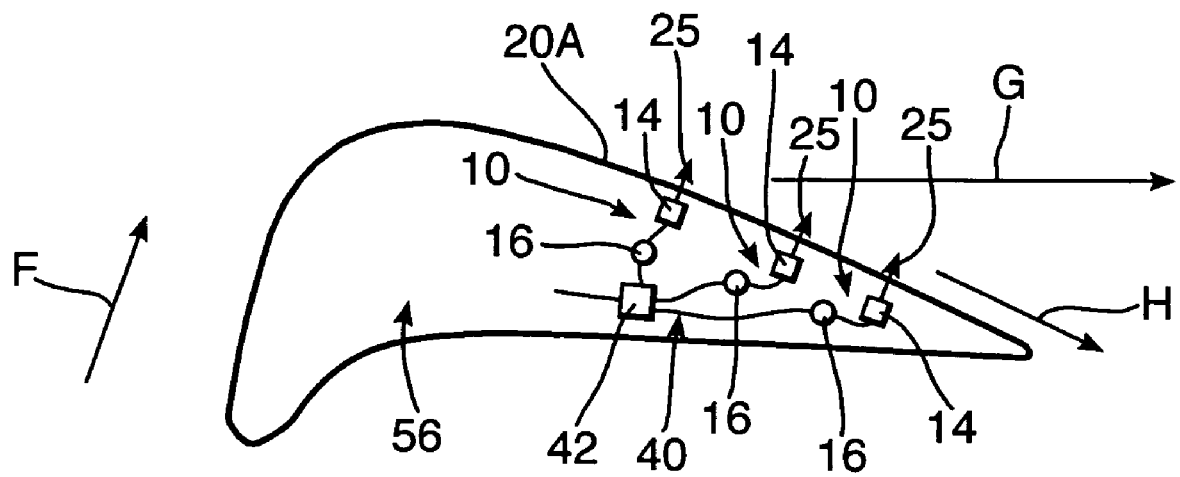
FIG. 9 is a diagrammatic view of a nozzle guide vane incorporating a boundary layer control arrangement.

Referring to FIG. 9, there is shown a diagrammatic sectional side view of a nozzle guide vane 56 of a turbine in a gas turbine engine. A boundary layer control system 40 comprising a plurality of boundary layer control arrangements 10 is provided to deliver pulsed air through apertures 25 in a first surface 20A of the nozzle guide vane 56.

The control arrangements 10 can be as described above and have many of the features of FIGS. 1 to 3, which are designated in the same reference numerals as in FIGS. 1 to 3.

The arrow G indicates the direction of flow of air across the surface 20A in the absence of pulsed jets of air. The arrow H indicates the direction of flow of air across the surface 56 in the presence of the pulsed jets of air. Alternatively, the flow of air indicated by the arrow G could be caused by the presence of pulsed jets of air, and the flow of air indicated by the arrow H could be caused by the absence of pulsed jets of air, depending upon the operational requirements.

Figure 10:
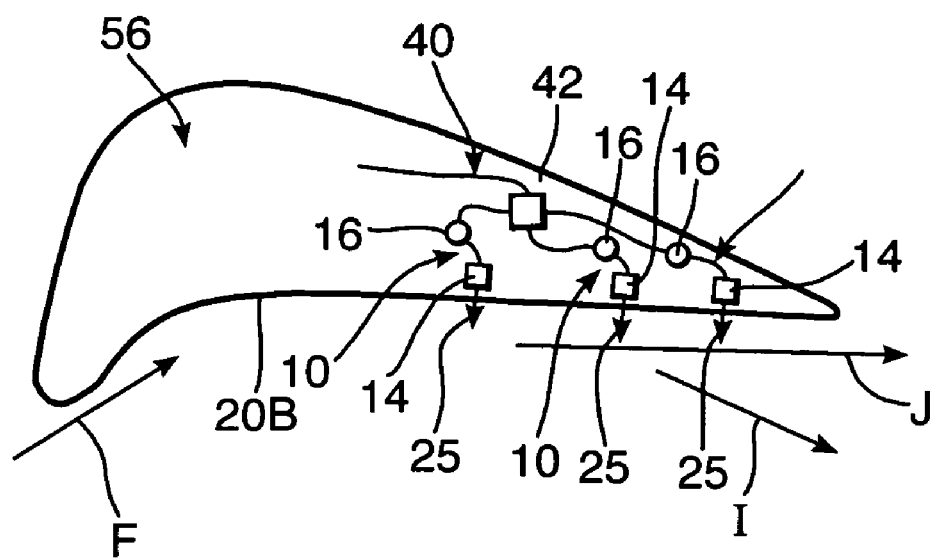
FIG. 10 is a diagrammatic view of a further nozzle guide vane incorporating a boundary layer control arrangement.

Similarly, FIG. 10 shows the nozzle guide vane 56 having a plurality of pulse generators 14, as described above, for directing pulsed air through apertures 25 onto a second surface 20B of the nozzle guide vane 56. The control arrangement 10 can be as described above and have many of the features of FIGS. 1 to 3, which are designated with the same reference numerals. The arrow J indicates in FIG. 10 the direction of flow of air in the absence of the pulsed jets from the apertures 25, and the arrow I indicates the direction of flow of air in the presence of the pulsed jets of air from the apertures 25. Alternatively, depending upon the operational requirements, the arrow J could represent the flow of air in the presence of pulsed jets of air, and the arrow I could represent the flow of air in the absence of pulsed jets of air. Similar arrangements can be used on other aerofoils such as on blades or other vanes.

Figure 11:
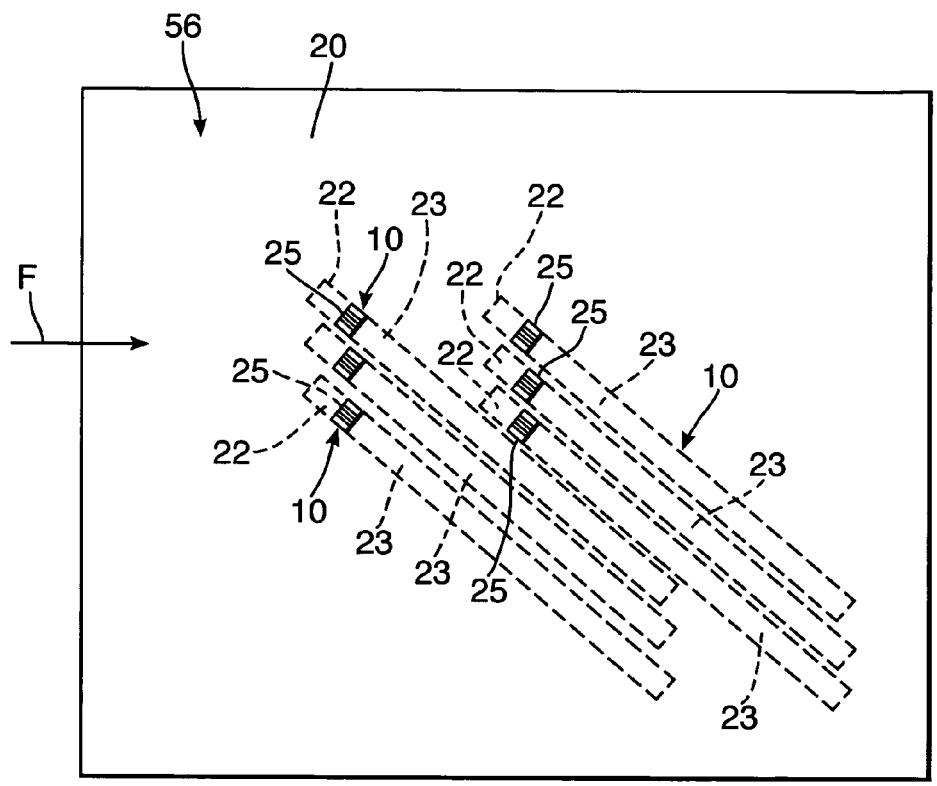
FIG. 11 is a diagrammatic view of the arrangement of a boundary layer control system on a nozzle guide vane shown in FIGS. 9 and 10.
Figure 12:
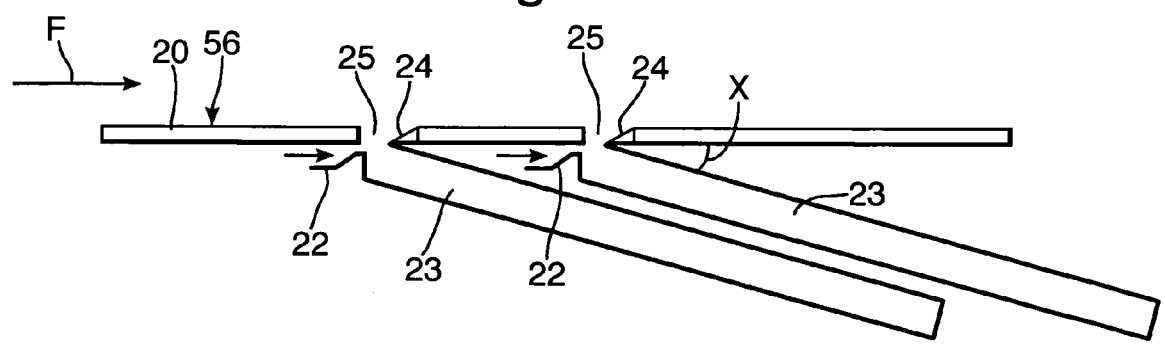
FIG. 12 is a diagrammatic sectional side view of the nozzle guide vane in FIG. 11 showing the arrangement of the boundary layer control arrangements in FIG. 11.

Referring to FIGS. 11 and 12, there is shown the orientation of the pulse generators 14 in the nozzle guide vane 54 shown in FIGS. 9 and 10. FIG. 11 shows the surface 20 (which can be either the first surface 20A (FIG. 9) or the second surface 20B (FIG. 10)). A plurality of obliquely arranged boundary control arrangements 10 are provided in groups of three across the surface 20. FIG. 12 shows that the respective chamber 23 of each of the pulse generators 14 is arranged at an angle X to the surface 20.

Figure 13:
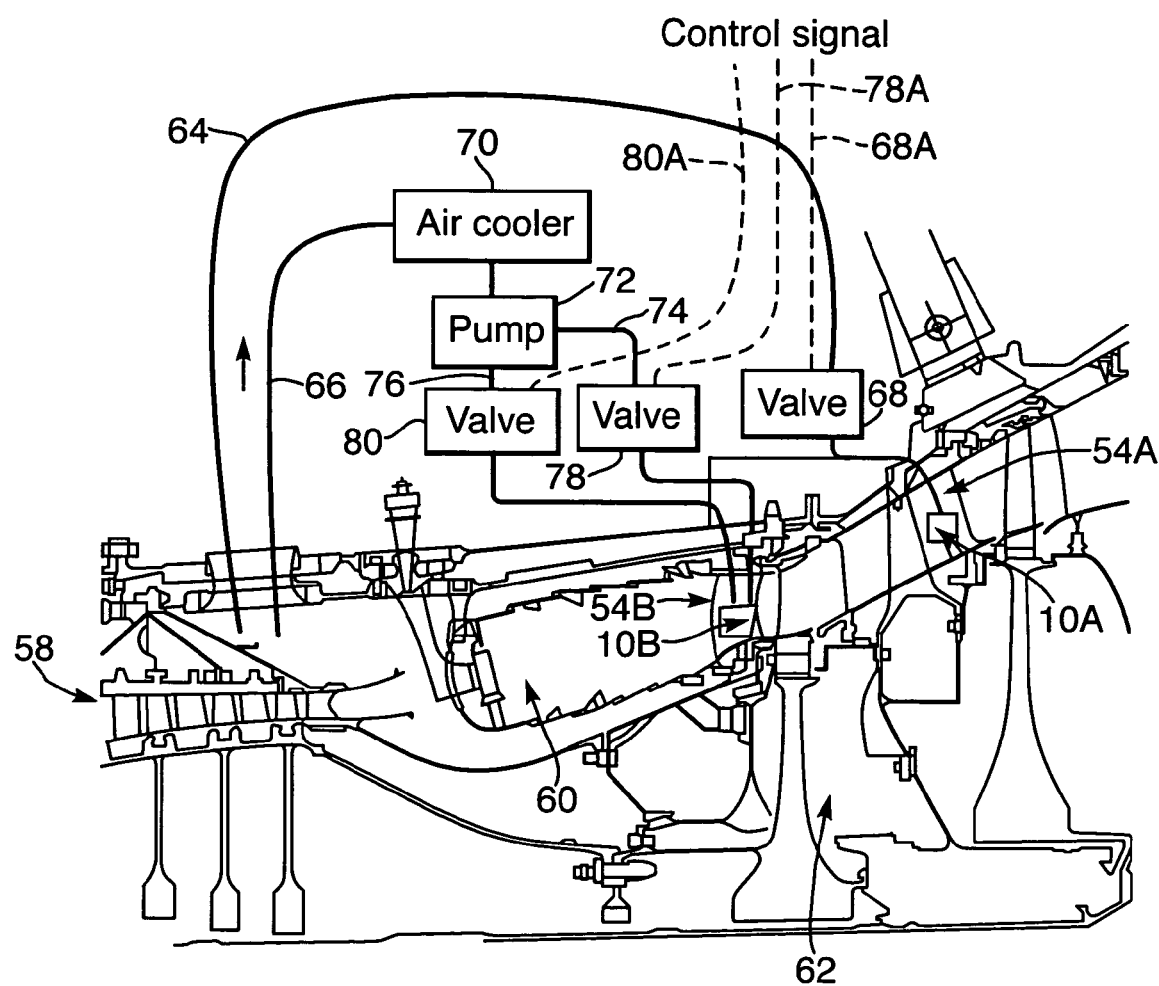
FIG. 13 shows a section of a gas turbine engine incorporating a boundary layer control arrangement.

FIG. 13 shows a compressor region 58 of the gas turbine engine, which supplies compressed air to a combustor 60 in which the compressed air is combusted in the presence of fuel. The combustion products expand to drive the turbines 62.

As can be seen from FIG. 13 compressed air is taken from the compressor 58 via first and second conduits 64, 66 to the turbines 62, by passing the combustor 60. Air in the first conduits 64 is passed to an on-off valve 68 and thereafter to a first boundary layer control arrangement 10A in nozzle guide vane 54A of the turbines 62.

Air in the second conduit 66 is passed through an air cooler 70 and a pump 72 splits the air into two streams via conduits 74, 76. The air in the conduits 74, 76 is passed through respective on-off valves 78, 80 and thereafter to a boundary layer control arrangement 10 B in a nozzle guide vane 54B of the turbines 62.

The valves 68, 78, 80 are controlled by control signals 68A, 78A, 80A from suitable controllers (not shown in FIG. 13).

Figure 14:
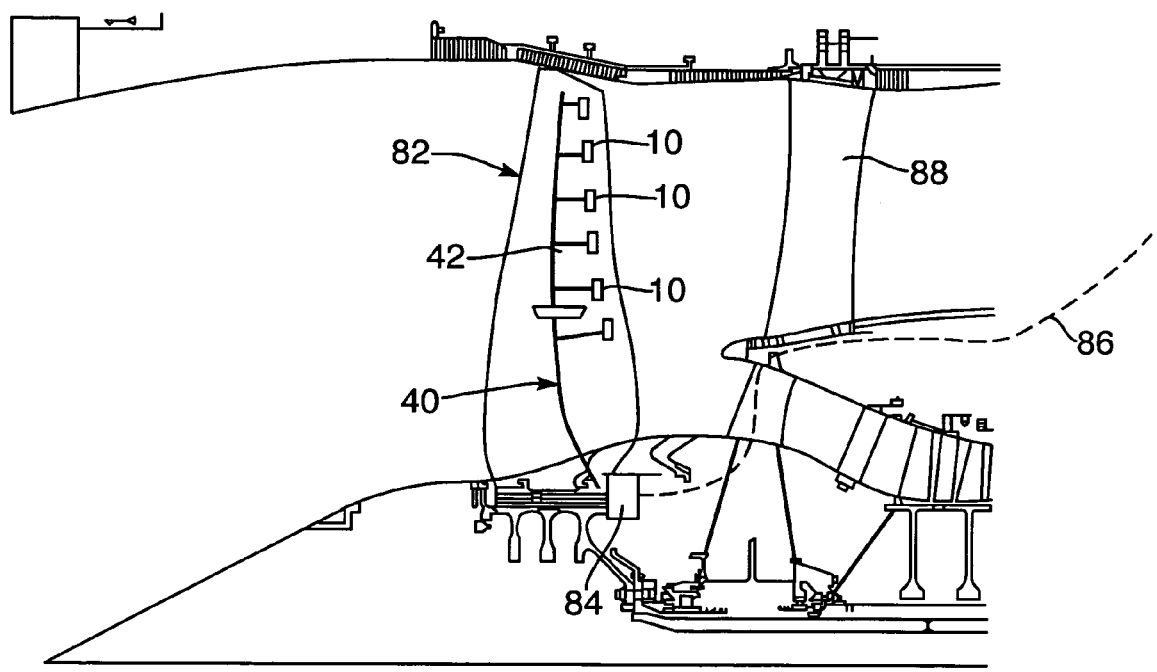
FIG. 14 is a sectional side view of a fan blade incorporating a boundary layer control system.

Referring to FIG. 14, there is shown a fan blade 82 having a boundary layer control system 40 comprising a plurality of boundary layer control arrangements 10 arranged towards the trailing edge of the fan blade 82. The boundary layer control system 40 comprises a manifold 42 for supplying air to each of the boundary layer control arrangements 10. Air is supplied to the manifold 42 via an on-off valve 84 which is controlled by a control signal 86. Each of the boundary layer control arrangements may be as described above, or may be another device and is used to disrupt the flow of air at the trailing edge of the fan blade.

This has the advantage in that it disrupts air in the wake of the fan thereby influencing the interaction of the air with the outlet guide vane 88, and reducing the noise of the engine.

Figure 15:
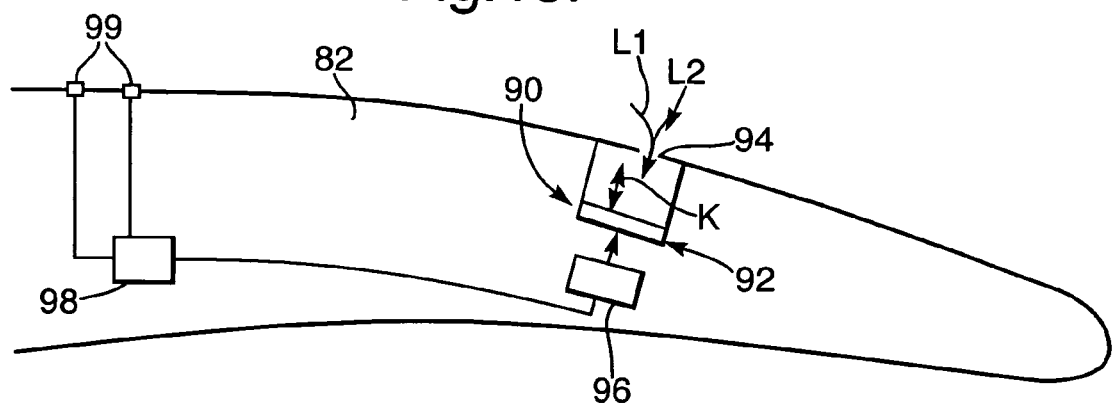
FIG. 15 shows a section of a fan blade with a boundary layer control device.
Figure 16:
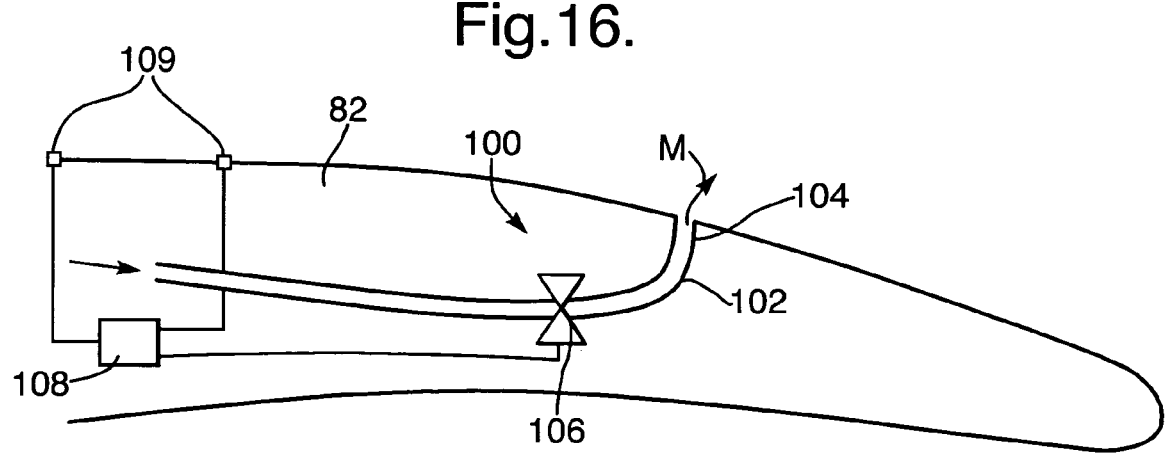
FIG. 16 shows a section of a fan blade with a further boundary layer control device.

As an alternative to the boundary layer control system 40, the fan blade 82 may comprise a control system that comprises a plurality of active boundary layer control arrangements such as those shown in FIGS. 15 and 16.

In FIG. 15, the fan blade 82 is provided with a plurality of first active boundary layer control arrangements 90 (only one of which is shown for clarity). Each first active boundary layer control arrangement 90 comprises a piston and cylinder arrangement provided 92 within the fan blade 82. The surface of the fan blade 82 defines an aperture 94 at each piston and cylinder arrangement 92.

The piston and cylinder arrangement 92 is moved reciprocally as shown by the double headed arrow K at a desired frequency. This results in a pulse of air into and out of the aperture 94 (as shown by the arrows L1, L2) thereby disrupting or energising the boundary layer across the fan blade 82.

The piston 92 is controlled by an actuator 96 which, in turn, is connected to control means 98 which in turn is connected to appropriate sensors 99 on the surface of the fan blade 82. The sensors 99 determine the conditions of the boundary layer and thereby the frequency of oscillation of the piston.

In FIG. 16, the blade 82 is provided with a plurality of second active boundary layer control arrangements 100, each of which comprises a conduit 102 which extends within the fan blade 82 to an outlet aperture 104 in the surface of the fan blade 82. Air is supplied along the conduit 102 to exit therefrom onto the surface via the outlet aperture 104 as shown by the arrow M.

A high speed valve 106 is provided within the conduit 102. The valve 106 oscillates at high frequency between open and closed conditions to create pulses in the air exiting out of the aperture 104.

The rate at which the valve 106 oscillates is controlled by suitable control means 108 and is dependent upon the boundary layer conditions. Suitable sensors 109 on the surface of the fan blade 82 are connected to the control means 108 for this purpose.

Each of the pulse generators arranged in the fan is supplied with air via a valve which is connected to a suitable electronic control means, as shown by the broken line.

Air can be supplied to the fan blade by means of centrifugal force provided by the rotating blade, or by other means such as bleeds from other parts of the engine, or using an auxiliary pump.

Various modifications can be made without departing from the scope of the invention.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. A boundary layer control arrangement, comprising:
a pulse generator communicating with a surface having a fluid boundary layer across the surface, and a fluid supply means for supplying a fluid to the surface via the pulse generator,
wherein the pulse generator is constructed such that the fluid acts on the pulse generator to cause the fluid to pulse, the action of the fluid on the pulse generator creates the pulses in the fluid and pulsing fluid passes from the pulse generator to the surface.

2. A boundary layer control arrangement according to claim 1, wherein the pulse generator comprises a passive pulse generator, for creating sound waves in the fluid, thereby establishing pulses in the fluid passed to the surface.

3. A boundary layer control arrangement according to claim 2, wherein the pulses in the fluid passed to the surface are in the form of sound waves.

4. A boundary layer control arrangement according to claim 1, wherein the pulse generator comprises a chamber to receive at least some of the fluid from the fluid supply means, the chamber being configured such that a standing wave is created in the fluid in the chamber.

5. A boundary layer control arrangement according to claim 4, wherein the pulse generator comprises a fluid splitting member to split fluid from the fluid supply means, such that some of said fluid passes into the chamber, and some of said fluid passes to the surface.

6. A boundary layer control arrangement according to claim 4, wherein the pulse generator defines an aperture via which the fluid supply means communicates with the surface, wherein the chamber extends from the aperture and a splitting member is provided at the aperture.

7. A boundary layer control arrangement according to claim 4, wherein the chamber is elongate.

8. A boundary layer control arrangement according to claim 1, wherein the pulse generator comprises a chamber having a sub-chamber, an exit conduit, a pressure responsive barrier and an urging arrangement to urge the pressure responsive barrier into sealing engagement with the exit conduit.

9. A boundary layer control arrangement according to claim 8, wherein the pulse generator defines an aperture through which fluid from said chamber can pass to the surface, via the exit conduit extending to said aperture, whereby fluid can pass from the sub-chamber to the aperture via said exit conduit.

10. A boundary layer control arrangement according to claim 9, wherein the fluid supply means supplies said fluid to the sub-chamber to cause the barrier to respond and allow said fluid to pass through the conduit, wherein the barrier responds by deforming to allow fluid in the sub-chamber to enter the exit conduit.

11. A boundary layer control arrangement according to claim 10, wherein the barrier is configured to respond when the pressure of fluid in the sub-chamber reaches a predetermined limit.

12. A boundary layer control arrangement according to claim 8, wherein the barrier is constructed to move to a deformed condition to open the conduit when the pressure in the chamber reaches a predetermined limit.

13. A boundary layer control arrangement according to claim 12, wherein when the fluid enters the conduit, the barrier moves to the non-deformed condition to close the conduit.

14. A boundary layer control arrangement according to claim 8, wherein the urging arrangement comprises a second sub-chamber containing fluid at a predetermined pressure, and the barrier comprises a flexible membrane which can respond when the pressure in the sub-chamber exceeds a predetermined pressure in the second sub-chamber to allow fluid to enter the exit conduit.

15. A boundary layer control arrangement according to claim 14, wherein the boundary layer control arrangement comprises adjustment means to adjust a frequency of the pulses in the fluid, and wherein the adjustment means comprises an adjustment aperture for the second sub-chamber to allow a fluid to flow into or out of the second sub-chamber, thereby adjusting the pressure in the second sub-chamber.

16. A boundary layer control arrangement according to claim 8, wherein the urging arrangement comprises a spring and the barrier comprises a piston having a sealing member urged into sealing engagement with the exit conduit by the spring.

17. A boundary layer control arrangement according to claim 16, wherein the barrier can respond when a force created by the pressure in the sub-chamber exceeds a force on the barrier by the spring.

18. A boundary layer control arrangement according to claim 8, wherein the urging arrangement comprises a spring and the barrier comprises a flexible membrane urged into sealing engagement with the exit conduit by the spring.

19. A boundary layer control arrangement according to claim 8, wherein the fluid supply means comprises a restrictor to restrict the rate of flow of fluid into the sub-chamber.

20. A boundary layer control arrangement according to claim 1, wherein the boundary layer control arrangement comprises a fluid supply regulator to regulate the supply of said fluid.

21. A boundary layer control arrangement according to claim 20, wherein the fluid supply regulator comprises a valve configured to have an on condition and an off condition.

22. A boundary layer control arrangement according to claim 20, wherein the fluid supply regulator comprises a valve configurable to vary the supply of said fluid continuously or in stepped changes.

23. A boundary layer control arrangement according to claim 1, wherein the boundary layer control arrangement comprises adjustment means to adjust a frequency of the pulses in the fluid.

24. A boundary layer control arrangement according to claim 23, wherein the adjustment means comprises a wall of the chamber, the wall being movable along said chamber to alter an effective length of the chamber, thereby altering a frequency of a standing wave in the chamber.

25. A boundary layer control arrangement according to claim 23, wherein the pulse generator comprises a vibrating member to receive fluid from the fluid supply means, the vibrating member able to vibrate by the action of fluid from the fluid supply means thereon.

26. A boundary layer control arrangement according to claim 25, wherein the vibrating member comprises a reed.

27. A boundary layer control system comprising a plurality of boundary layer control arrangements as claimed in claim 1.

28. A boundary layer control system according to claim 27, wherein the boundary layer control system comprises fluid distribution means to distribute fluid to respective boundary layer control arrangements.

29. A boundary layer control system according to claim 28, wherein the fluid distribution means comprises a manifold.

30. A gas flow conduit of an engine, the gas flow conduit comprising a boundary layer control arrangement as claimed in claim 1.

31. A gas flow conduit according to claim 30, wherein the gas flow conduit comprises a gas intake for the engine.

32. A gas flow conduit according to claim 31, wherein the engine comprises a gas turbine engine and the intake comprises a nacelle of the engine.

33. A gas flow conduit according to claim 30, wherein the conduit comprises a boundary layer control arrangement on an inner surface of the conduit.

34. A gas flow conduit according to claim 30, wherein the conduit comprises a boundary layer control arrangement on the outer surface.

35. A gas flow conduit according to claim 30, wherein the conduit comprises a duct in a gas turbine engine.

36. A gas flow conduit according to claim 30, wherein characteristics of the boundary layer control arrangement are pre-selected to match conditions of the conduit.

37. A gas flow conduit according to claim 30, wherein the conduit comprises a plurality of boundary layer control arrangements.

38. An aerofoil comprising a boundary layer control arrangement to control the boundary layer of fluid flowing across the aerofoil, wherein the boundary layer control arrangement is as claimed in claim 1.

39. An aerofoil according to claim 38, wherein the boundary layer control arrangement is an active boundary layer control arrangement.

40. An aerofoil according to claim 39, wherein the active boundary layer control arrangement comprises a piston and cylinder arrangement, which communicates with the surface of the aerofoil via an aperture control means to control a rate of reciprocation of the piston in the cylinder, thereby providing a pulsed jet of air into and out of the cylinder through the aperture.

41. An aerofoil according to claim 39, wherein the active boundary layer control arrangement comprises a conduit to supply air to a surface of the aerofoil via an aperture and an oscillating valve is provided in the conduit to provide pulsed air out of the aperture, the valve able to oscillate between open and substantially closed conditions to provide said pulsed air.

42. An aerofoil according to claim 38, wherein the aerofoil comprises a fan blade of a fan of a gas turbine engine or a vane of a rotary component of a gas turbine engine.

43. An aerofoil according to claim 42, wherein the vane comprises a stator vane of a compressor, or a nozzle guide vane of a turbine.

44. An aerofoil according to claim 43, wherein the boundary layer control arrangement is arranged towards a trailing edge of the fan blade, whereby the boundary layer control arrangement disrupts air towards the trailing edge, thereby disrupting an interaction of the air in a wake with a further aerofoil downstream of the fan blade.

* * * * *